US008457665B2

(12) United States Patent
Damarla

(10) Patent No.: US 8,457,665 B2
(45) Date of Patent: Jun. 4, 2013

(54) INTERACTIVE SHORT MESSAGING SERVICE

(75) Inventor: Chanakya C. Damarla, Pittsburgh, PA (US)

(73) Assignee: Brainstorm SMS Technologies, LLC, Pittsburgh, PA (US)

( * ) Notice: Subject to any disclaimer, the term of this patent is extended or adjusted under 35 U.S.C. 154(b) by 219 days.

(21) Appl. No.: 12/808,442

(22) PCT Filed: Dec. 22, 2008

(86) PCT No.: PCT/US2008/087905
§ 371 (c)(1),
(2), (4) Date: Jul. 28, 2010

(87) PCT Pub. No.: WO2009/086249
PCT Pub. Date: Jul. 9, 2009

(65) Prior Publication Data
US 2010/0298012 A1 Nov. 25, 2010

Related U.S. Application Data

(60) Provisional application No. 61/015,364, filed on Dec. 20, 2007.

(51) Int. Cl.
*H04W 4/00* (2009.01)
*H04W 4/12* (2009.01)
*H04L 12/58* (2006.01)
*H04M 3/42* (2006.01)

(52) U.S. Cl.
USPC .............. 455/466; 455/412.1; 455/414.1

(58) Field of Classification Search
USPC ............. 380/259–260, 270; 709/204–207, 709/227–229; 455/405, 412.1–418, 466
See application file for complete search history.

(56) References Cited

U.S. PATENT DOCUMENTS

| | | | |
|---|---|---|---|
| 2003/0114174 | A1 | 6/2003 | Walsh et al. |
| 2004/0198322 | A1* | 10/2004 | Mercer ................. 455/412.1 |
| 2004/0215721 | A1 | 10/2004 | Szeto et al. |
| 2006/0242230 | A1* | 10/2006 | Smith et al. ................. 709/203 |
| 2007/0142029 | A1 | 6/2007 | Willehadson et al. |
| 2007/0156909 | A1 | 7/2007 | Osborn et al. |
| 2007/0282851 | A1* | 12/2007 | Wingfield et al. ............... 707/10 |

FOREIGN PATENT DOCUMENTS

| | | |
|---|---|---|
| WO | 03053083 A2 | 6/2003 |
| WO | 2009029701 A1 | 3/2009 |

* cited by examiner

*Primary Examiner* — Marisol Figueroa
*Assistant Examiner* — Erica Navar
(74) *Attorney, Agent, or Firm* — The Webb Law Firm

(57) ABSTRACT

In a system and method of session based short message service (SMS) communications, unallocated tokens that are freely assignable are stored. A first unallocated token is assigned to a first message dispatched from a first application. A reply to the first message is routed to the first application utilizing the first token assigned thereto. A second unallocated token is assigned to a second message dispatched from the first application. A reply to the second message is routed to the first application utilizing the second token assigned thereto.

13 Claims, 7 Drawing Sheets

SMS Message (200)

| To Field: (210) |
|---|
| From Field: (220) |
| Message: (230) |
| Token: (240) |

Fig 2

INTERACTIVE SHORT MESSAGING SERVICE

CROSS REFERENCE TO RELATED APPLICATION

The present application claims priority from U.S. Provisional Patent Application No. 61/015,364, filed Dec. 20, 2007, which is incorporated herein by reference.

BACKGROUND OF THE INVENTION

1. Field of the Invention

The present invention relates to session management systems and methods that enable users of two-way electronic messaging systems, such as SMS (Short Messaging System), Email or IM (Instant Messaging), to simultaneously interact with multiple applications. The invention has particular, although not exclusive, application to simultaneously linking users with SMS-enabled mobile devices to multiple web-based applications.

2. Description of Related Art

Short Message Service (SMS) or "text messaging" was initially implemented as a "back channel," for cellular telephone carriers, for signaling a cellular telephone of events such as voice mail. SMS later became used as a mechanism for users to send short messages (in text format) to each other. As of late, SMS is being used in a business-consumer model to "push" content (advertisements, coupons and ring tones) to consumers.

However, the use of SMS in more sophisticated applications is limited because SMS does not support a generic and flexible session management system. This is a byproduct of the fact that SMS was originally intended as a one way messaging system. While, SMS was later extended to allow simple responses, full session management functionality was never added to it. As a result SMS does not provide a way for applications to maintain ongoing discussions or sessions with a user over multiple, out-of-sequence message exchanges.

The lack of a flexible session-management system hinders the development of fully interactive SMS data applications. The core problem is that inter- and intra-application state cannot be properly managed by present message routing/application integration systems in the art without placing an undue burden on either users or application developers.

Two major techniques have been developed, to enable "interesting" applications over SMS: Keyword routing systems and Address routing systems. Both methods do not provide the flexibility that we desire.

Keyword routing systems use the contents of a user's message to maintain state/session information. Users wishing to send messages to specific applications or to invoke specific actions on applications must type in enough information into their messages in order to uniquely identify the application or the action on the application to invoke. For example, user messages beginning with "GAME1" can be routed to the GAME1 application and messages beginning with "GAME2" can be routed to the GAME2 application. Similarly, it is possible to invoke specific actions on an application by combining an application ID and an action ID. So, for example, users messages beginning with "GAME1:ACTION1." can be routed to Action1 action in the GAME1 application. Keyword routing systems place an undue burden on consumers by requiring them to remember and type in keywords for every response they send an application. This is not a trivial task given the form factors of mobile devices. Because these systems place a heavy burden on users, they can cause significant user confusion and errors.

Address based routing systems use different addresses to encode state/session information. Applications are assigned a set of reply-to-addresses. Then, applications use these addresses to encode state/session information. For example, an application may know that incoming responses to ADDR1 invoke a callback 1 and incoming responses to ADDR2 invoke a callback 2 and so forth. Address based routing systems place an undue burden on application providers. When using an address based routing system, application developers must maintain state utilizing the application's set of assigned "reply-to" addresses. This requires application developers to assign "reply-to" addresses for each message they generate and properly associate the correct action with the various possible replies to this message. Further, they have to implement policies for how long to persist these associations and when and how to reuse a previously used address. These policies are non-trivial and when implemented incorrectly may cause user confusion or place applications in awkward states. Further, these systems use the total address space inefficiently because applications must be assigned a set of addresses in advance so they can be developed appropriately. So while a user may only use ten applications his whole address spaces is allocated to all the applications registered with the address routing system.

It would, therefore, be desirable to provide a system and method that overcomes the above problems and others.

SUMMARY OF THE INVENTION

One embodiment of the present invention is a method of session based interactive short messaging via an intermediate device. This method includes: (a) receiving a first message from a first device at the intermediate device; (b) responsive to the first message, the intermediate device initiating a first call to a second device, wherein the first call is based on the contents of the first message; (c) responsive to the first call, the intermediate device receiving from the second device a second message intended for the first device; (d) responsive to the second message, the intermediate device appending a first token to said second message; (e) responsive to the second message and appended first token in step (d), the intermediate device receiving from the first device said first token appended to a third message dispatched in response to the second message; (f) responsive to the third message, the intermediate device initiating a second call to the second device, wherein the second call is based on the contents of the third message; and (g) responsive to the second call, the intermediate device receiving from the second device a fourth message dispatched by the second device to the first device.

The method can further include: (h) responsive to the fourth message dispatched in step (g), the intermediate device appending a second token to said fourth message; (i) responsive to the fourth message and appended second token in step (h), the intermediate device receiving from the first device said second token appended to a fifth message dispatched in response to the fourth message; (j) responsive to the fifth message, the intermediate device initiating a third call to the second device, wherein the third call is based on the contents of the fifth message; and (k) responsive to the third call, the intermediate device receiving from the second device a sixth message dispatched by the second device to the first device.

In this embodiment, the first device can be a mobile device; the second device can be an application server; the first, third and fifth messages can be mobile initiated messages initiated by the mobile device; and the second, fourth and sixth message can application initiated messages initiated by an application service of the application server.

The content of each mobile initiated message that the intermediate service utilizes to initiate a call to the application hosted by the application service can include at least one of the following: an ID (cell number, user name, etc.) associated with the mobile device; a delivery destination of the mobile initiated message; at least a portion of a body of the mobile initiated message; and the appended token, if available, associated with the mobile initiated message.

The token included in an application initiated message can be selected based on at least one of the following: an identification (cell number, user name, etc.) associated with the mobile device; and a reply-to-address associated with the message.

The first and second tokens can be the same.

Another embodiment of the invention is a method of session based interactive short messaging via an intermediate device. This method includes: (a) the intermediate device conveying a first message from a first device to a second device; (b) the intermediate device appending a first token to the first message in step (a); (c) responsive to the first message and appended first token in step (b), the intermediate device receiving from the second device said first token appended to a second message dispatched in response to the first message; (d) responsive to receiving the second message and appended first token in step (c), the intermediate device initiating a first call to the first device based on the contents of the second message; (e) responsive to the first call, the intermediate device conveying a third message from the first device to the second device; (f) the intermediate device appending a second token to the third message in step (e); (g) responsive to the third message and appended second token in step (f), the intermediate device receiving from the second device said second token appended to a fourth message dispatched in response to the third message; (h) responsive to the fourth message, the intermediate device initiating a second call to the first device based on the contents of the fourth message; and (i) responsive to the second call, the intermediate device conveying a fifth message from the first device to the second device.

The method can further include: (j) the intermediate device appending a third token to the fifth message in step (i); (k) responsive to the fifth message and appended third token in step (l), the intermediate device receiving from the second device said third token appended to a sixth message dispatched in response to the fifth message; (l) responsive to the sixth message, the intermediate device initiating a third call to the application hosted by the first device based on the contents of the sixth message; and (m) responsive to the third call, the intermediate device conveying a seventh message from the first device to the second device.

In this embodiment, the first device can be an application server; the second device can be a mobile device; the first, third, fifth and seventh messages can be application initiated messages initiated by an application service of the application server; and the second, fourth and sixth message can be mobile initiated messages initiated by the mobile device.

The content of each mobile initiated message that the intermediate service utilizes to initiate a call to the application hosted by the application service can include at least one of the following: an ID (cell number, user name, etc.) associated with the mobile device; a delivery destination of the mobile initiated message; at least a portion of a body of the mobile initiated message; and the appended token, if available, associated with the mobile initiated message.

The token included in an application initiated message can be selected based on at least one of the following: an ID (cell number, user name, etc.) associated with the mobile device; and a reply-to-address associated with the message.

The first, second or third tokens can be the same.

Another embodiment of the invention is a method of session based interactive short messaging via an intermediate device. This method includes: (a) receiving a first message from a first device at the intermediate service; (b) responsive to the first message, the intermediate service initiating a first call to a second device, wherein the first call is based on the contents of the first message; (c) responsive to the first call, the intermediate service receiving from the second device a second message dispatched by the second device to the first device; (d) responsive to the second message dispatched in step (c), the intermediate service storing a first response-callback binding that specifies an action to be taken in response to the intermediate service receiving a response to the second message that is related to the first response-callback binding; (e) responsive to the second message and the first response-callback binding stored in step (d), the intermediate service appending a first token to said second message; (f) responsive to the second message and appended first token in step (e), the intermediate service receiving from the first device said first token appended to a third message dispatched in response to the second message; (g) responsive to the third message, the intermediate service identifying and executing an first application callback based on the contents of the third message and the first response-callback binding stored in step (d); and (h) responsive to the first application callback in step (g), the intermediate service receiving from the second device a fourth message dispatched by the second device to the first device.

The method can further include: (i) responsive to the fourth message dispatched in step (h), the intermediate service storing a second response-callback binding that specifies an action to be taken in response to the intermediate service receiving a response to the fourth message that is related to the second response-callback binding; (j) responsive to the fourth message and the second response-callback binding stored in step (i), the intermediate service appending a second token to said fourth message; (k) responsive to the fourth message and appended second token in step (j), the intermediate service receiving from the first device said second token appended to a fifth message dispatched in response to the fourth message; (l) responsive to the fifth message, the intermediate service identifying and executing a second application callback based on the contents of the fifth message and the second response-callback bindings stored in step (i); and (m) responsive to the second application callback, the intermediate service receiving from the second device a sixth message dispatched by the second device to the first device.

In this embodiment, the first device can be a mobile device; the second device is can be application server; the first, third and fifth messages can be mobile initiated messages initiated by the mobile device; and the second, fourth and sixth message can be application initiated messages initiated by an application service of the application server.

The content of each mobile initiated message that the intermediate service utilizes to initiate a call to the application hosted by the application service can include at least one of the following: an ID (cell number, user name, etc.) associated with the mobile device; a delivery destination of the mobile initiated message; at least a portion of a body of the mobile initiated message; and the appended token, if available, associated with the mobile initiated message.

The token included in an application initiated message can be selected based on at least one of the following: an identification (cell number, user name, etc.) associated with the mobile device, a reply-to-address associated with the message and currently stored response-callback bindings.

The first and second tokens can be the same.

Another embodiment of the invention is a session based interactive short messaging system that includes: means for receiving a first mobile initiated message from a mobile device; means for initiating a first call to an application hosted by an application service based on the contents of the first mobile initiated message; means for receiving from the application service a first application initiated message dispatched by the application service to the mobile device; means for selecting a first token based on the at least one of: an identification (cell number, user name, etc.) associated with the mobile device or a reply-to-address associated with the first application initiated message; means for appending said first token to said first application initiated message; means for receiving from the mobile device said first token appended to a second mobile initiated message dispatched by the mobile device in response to the first application initiated message; means for initiating a second call to the application hosted by the application service, wherein the second call is based on the contents of the second mobile initiated message, wherein these contents include at least one of the following: an ID of the mobile device, a delivery destination, a portion of the body and the appended token, if available; and means for receiving from the application service a second application initiated message dispatched by the application service to the mobile device.

The system can further include: means for selecting a second token, which may be the same as the first token, based on at least one of an identification (cell number, user name, etc.) associated with the mobile device, a reply-to-address associated with the first application initiated message; means for appending said second token to said second application initiated message; means for receiving from the mobile device said second token appended to a third mobile initiated message dispatched by the mobile device in response to the second application initiated message; means for initiating a third call to the application hosted by the application service, wherein the third call is based on the contents of the third mobile initiated message, wherein these contents include at least one of the following: an ID of the mobile device, a delivery destination, a portion of the body or the appended token, if available; and means for receiving from the application service a third application initiated message dispatched by the application service to the mobile device.

Another embodiment of the invention is a system for of session based interactive short messaging that includes: means for conveying a first application initiated message from an application service to a mobile device; means for selecting a first token based on at least one of an identification (cell number, user name, etc.) associated with the mobile device or a reply-to-address associated with the first application initiated message; means for appending said first token to the first application initiated message; means for receiving from the mobile device a first mobile initiated message having the first token appended thereto by the mobile device; means for initiating a first call to an application hosted by the application service based on the contents of the first mobile initiated message, wherein these contents include at least one of the following: an ID of the mobile device, a delivery destination, a portion of the body and the appended token, if available; means for conveying a second application initiated message from the application service to the mobile device; means for selecting a second token, which may be the same as the first token, based on at least one of: an identification (cell number, user name, etc.) associated with the mobile device; a reply-to-address associated with the second application initiated message; means for appending said second token to the second application initiated message; means for receiving from the mobile device a second mobile initiated message having the second token appended thereto by the mobile device; means for initiating a second call to the application hosted by the application service based on the contents of the second mobile initiated message, wherein these contents include at least one of the following: an ID of the mobile device, a delivery destination, a portion of the body and the appended token, if available; and means for conveying a third application initiated message from the application service to the mobile device.

The system can further include: means for selecting a third token, which may be the same as the first or the second token, based on at least one of an identification (cell number, user name, etc.) associated with the mobile device; a reply-to-address associated with the third application initiated message; means for appending said third token to the third application initiated message; means for receiving from the mobile device a third mobile initiated message having the third token appended thereto by the mobile device; means for initiating a third call to the application hosted by the application service based on the contents of the third mobile initiated message, wherein these contents include at least one of the following: an ID of the mobile device, a delivery destination, a portion of the body or the appended token, if available; and means for conveying a fourth application initiated message from the application service to the mobile device.

Lastly, another embodiment of the invention is a system of session based interactive short messaging that includes: means for receiving a first mobile initiated message from a mobile device; means for initiating a first call to an application hosted by an application service, wherein the first call is based on the contents of the first mobile initiated message; means for receiving from the application service a first application initiated message dispatched by the application service to the mobile device; means for storing a first response-callback binding that specifies an action to be taken in response to the first application initiated message; means for selecting a first token based on at least one of: an identification (cell number, user name, etc.) associated with the mobile device; a reply-to-address associated with the third application initiated message and currently stored response-callback bindings; means for appending said first token to said first application initiated message; means for receiving from the mobile device said first token appended to a second mobile initiated message dispatched in response to the first application initiated message; means for identifying and executing a first application callback based on the contents of the second mobile initiated message, wherein these contents include at least one of the following: an ID of the mobile device, a delivery destination, a portion of the body or the appended token, if available; and the first response-callback binding; and means for receiving from the application service a second application initiated message dispatched by the application service to the mobile device.

The system can further include: means for storing a second response-callback binding that specifies an action to be taken in response to the second application initiated message; means for selecting a second, which may be the same as the first token, based on at least one of an identification (cell number, user name, etc.) associated with the mobile device; a reply-to-address associated with the third application initiated message and currently stored response-callback bindings; means for appending a second token to said second application initiated message; means for receiving from the mobile device said second token appended to a second mobile initiated message dispatched in response to the first application initiated message; means for identifying and executing a second application callback based on the contents of the third mobile initiated message, wherein these contents include at least one of the following: an ID of the mobile device, a delivery destination, a portion of the body or the appended token, if available; and the second response-callback; and means for receiving from the application service a second application initiated message dispatched by the application service to the mobile device.

BRIEF DESCRIPTION OF THE DRAWINGS

FIG. 2 is an illustration of the fields of an exemplary short message service (SMS) Message;

DESCRIPTION OF THE PREFERRED EMBODIMENT(S)

Figure 1:
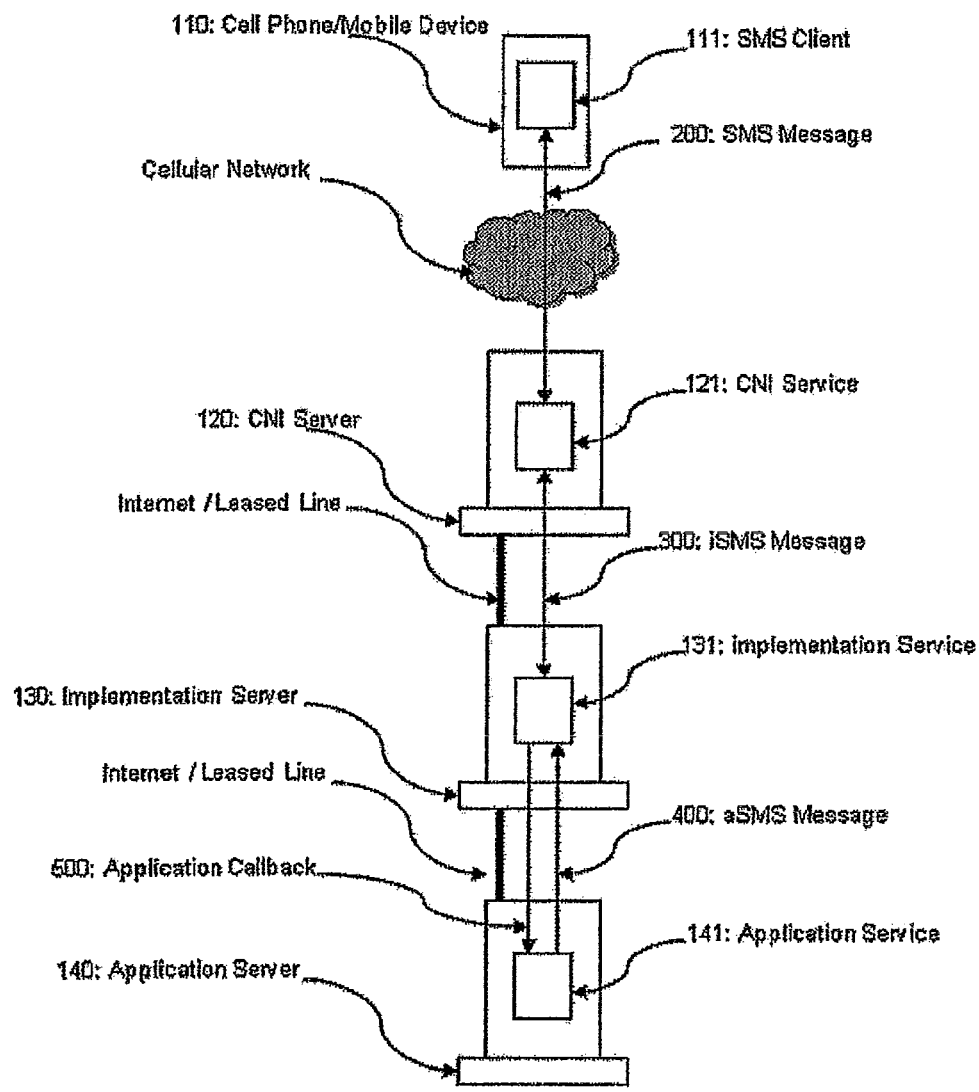
FIG. 1 is a block diagram of a system for implementing a method of the present invention.

With reference to FIG. 1 a block diagram of a system for implementing a method of the present invention a Cell Phone/Mobile Device 110. Cell Phone/Mobile Device 110 hosts a software component called SMS Client 111. Each mobile user of a Cell Phone/Mobile Device 110 utilizes SMS Client 111 to send and receive SMS messages 200. These messages may be communications with other users or communications with data applications.

Cellular Network Interface Server (CNI Server) 120 hosts Cellular Network Interface Service (CNI Service) 121. Herein, the CNI Server 120 and CNI Service 121 are used to encapsulate the many, potentially geographically distributed, components that may be used to facilitate SMS communications between SMS Clients 111 and between SMS Clients 111 and data applications. Accordingly, the description of CM server 120 and CNI Service 121 are not to be construed as limiting the invention.

Specifically, most cellular networks have a Short Message Service Center (SMSC) that enables SMS traffic. All SMS Messages 200 within a cellular network are forwarded to that network's SMSC Service. This service delivers SMS Messages 200 via a store-forward mechanism to a cell phone or a data application. In the present discussion the SMSC Service is considered to be a part of CNI Service 121.

In addition, many cellular networks have Email Gateways that enable applications to send SMS Messages 200 using various mail protocols such as SMTP or POP3. For example, to send an SMS message to a user on the Sprint cellular network it is possible to send an email to the address <NUMBER>@messaging.sprintpcs.com. Upon receiving this incoming email, the Sprint Email Gateway communicates with the Sprint network's SMSC Service in order to actually transmit an SMS Message 200 to the user. User replies to this SMS Message 200 are first forwarded to the Sprint network's SMSC Service, which forwards the reply to the email gateway which in turn forwards the reply to the originating application using email. Similar gateways also exist for instant messenger services. Herein, Email Gateways and IM Gateways, if present, are considered part of CNI Service 121.

Finally, it is common for application developers to use so-called SMS aggregators, such as mBlox in the United States, as a single interface point to the major carriers. If an SMS aggregator is being used, an application wishing to send an SMS Message 200 to a mobile user would first forward the message to the SMS aggregator. The SMS aggregator would then forward this message to the appropriate SMSC service that is part of CNI Service 121 herein, i.e. the SMSC service associated with the user's cellular network. The SMSC service then forwards this message to the user's SMS Client 111. Each user reply to this SMS message will first be forwarded to the user's cellular network's SMSC Service, part of CNI Service 121 herein, which then forwards the reply to the SMS aggregator which in turn forwards the reply to the originating application. Herein, all components associated with SMS aggregators, if present, are considered part of CNI Service 121.

As can be seen CNI Service 121 may comprise many, potentially geographically dispersed, components. Herein, CNI Service 121 can be considered a black box that facilitates SMS communications between SMS Clients 111 and between SMS Clients 111 and data applications. In order to properly perform its routing functionality CNI Service 121 is appropriately configured and may perform address translation as explained later in this disclosure.

An Implementation Server 130 hosts a software component called an Implementation Service 131. Herein, SMS Messages 200 originating from or bound to data applications are first processed by the Implementation Service 131. Implementation Service 131 may optionally include a database that is used to store information important to its proper functioning.

Lastly, an Application Server 140 hosts one or more Application Services 141. Each Application Service 141 implements application-specific logic, generates all application specific content sent to users and performs the appropriate logic in response to incoming user messages/replies. Application Service 141 may optionally include a database that is used to store information important to its proper functioning.

Cell Phone/Mobile Device 110 is connected to CNI Server 120 via a cellular network, such as a CDMA, TDMA or GSM network. Based on the network being used, SMS Client 111 and CNI Service 121 communicate with each other utilizing various well-known SMS Message/Transport protocols that define message formats, message routing and connection provisioning. These standards are specified by the GSM community and may be found at www.etsi.org.

Regardless of the exact cellular network connecting Cell Phone/Mobile Device 110 to CNI Server 120 or the exact SMS Message/Transport protocols connecting SMS Client 111 to CNI Service 121, SMS Messages 200 are transmitted between SMS Clients 111 and CNI Services 121.

For the purposes of clarity messages that are transmitted from SMS Client 111 are called Mobile Originated SMS Messages. Messages that are transmitted to SMS Client 111 are called Mobile Terminated SMS Messages.

FIG. 2 illustrates fields that all SMS Messages 200 include. As can be seen, an SMS Messages 200 includes four major fields. A To Field 210 identifies the intended recipient of a message. When the recipient of the message is a mobile client this field is typically the client's mobile cell phone number. When the recipient of the message is an application, this field is typically a short code or a short code with an appended suffix. A From Field 220 identifies the sender of the message. When the sender is a mobile client, the From Field 220 is typically the mobile client's mobile cell phone number. When the sender is an application, the From Field 220 is typically a short code or a short code with an appended suffix. A Message Field 230 identifies the content of the SMS Message 200. This content is what is displayed on the display of Cell Phone/Mobile Device 110 by the mobile user's SMS Client 111 or is what a data application processes to respond to a user query. A Token 240 is a new field, added as a part of the present invention, used by applications to track state as explained herein. How the Token 240 is implemented over various SMS protocols is implementation specific. For example, it is possible that an SMS protocol agrees that the last five characters of the SMS message body is the token. In this case the SMS Client would know that the last five characters are the token and when a user responds to a message that has a token associated with it, the SMS Client 111 will append this token to user response. Alternatively, it is possible that an SMS protocol defines a token to be part of the SMS over-the-air transfer format. Regardless of how the Token 240 is defined, both SMS Clients 111 and Implementation Services 131 understand this protocol and can use it to implement session management over SMS as explained herein.

Each SMS Client 111 forwards all mobile originated SMS Messages 200 to its cellular network's CNI Service 121. CNI Service 121 routes received mobile originated SMS Messages 200 to the appropriate place based on To Field 210 of received mobile originated SMS Message 200. If To Field 210 is a cellular telephone number on this CNI Service's 121 cellular network, it locates the client within the cellular network and forwards the message to the SMS Client 111. If the To Field 210 is a cellular telephone number on a different cellular network, CNI Service 121 forwards the message to this other cellular network's CNI Service 121. This other cellular network's CNI Service 121 then locates the client within its cellular network and forwards the message to the SMS Client 111. If the To Field 210 is a short code, a short code with an appended suffix or is associated with data application, CNI Service 121 forwards the mobile originated SMS Message 200 to the data application using a pre-configured transport and communications protocol. Herein, all mobile originated SMS Messages 200 that are intended for data applications are first forwarded to Implementation Service 131 for processing.

CNI Server 120 and Implementation Server 130 can be connected to each other via a dedicated leased line, via the internet and/or in any other suitable/desirable manner. However, this is not to be construed as limiting the invention since it is envisioned that CNI Server 120 and Implementation Server 130 can be connected in communication with each other via any suitable and/or desirable communication medium that facilitates communication there between. For the purpose of the following description, the communication medium between CNI Server 120 and Implementation Server 130 will be described as being a physical connection. However, this is not to be construed as limiting the invention.

Over this connection, CNI Service 121 and the Implementation Service 131 communicate with each other utilizing various transport and communications protocols such as, without limitation, HTTP: for web based communications; (described at www.w3c.org.); SMTP for e-mail based communications (described at www.ieee.org); and SMPP for Short Message Peer-to-Peer based communications (described at www.etsi.org). Regardless of the exact protocol being used for communication between CNI Service 121 and Implementation Service 131, Implementation SMS Messages (iSMS Messages) 300 are transmitted between CNI Service 121 and Implementation Service 131.

For the purposes of clarity iSMS Messages transmitted from CNI Service 121 to Implementation Service 131 are called Mobile Originated iSMS Messages. iSMS Messages transmitted from Implementation Service 131 to CNI Service 121 are called Mobile Terminated iSMS Messages.

Figure 3:
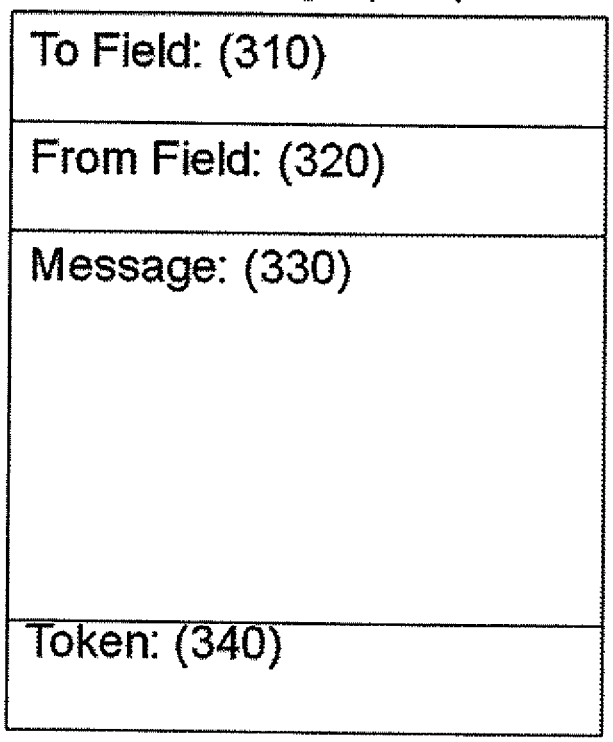
FIG. 3 is an illustration of the fields of an exemplary implementation SMS Message.

FIG. 3 illustrates fields that all iSMS Messages 300 include. iSMS Messages 300 are very similar to SMS Messages 200. However, a distinction is made between iSMS Messages 300 and SMS Messages 200 because they may contain different information based on the components that comprise CNI Service 121 and the transport and communications protocols connecting CNI Services 121 and Implementation Services 131.

In order for CNI Service 121 to forward messages to data applications in general and Implementation Services 131 in particular, CNI Service 121 is appropriately configured. CNI Service 121 desirably maintains bindings between "addresses" and Implementation Services 131. These "addresses" may be short codes, short codes with appended suffixes, email addresses or IM addresses.

CNI Service 121 is desirably configured to associate a specific short code with a given Implementation Service 131. When CNI Service 121 receives a mobile originated SMS Message 200 where To Field 210 is this configured short code, CNI Service 121 converts the mobile originated SMS Message 200 to mobile originated iSMS Message 300 and forwards it to Implementation Service 131 previously configured with the given short code. This conversion produces mobile originated iSMS Message 300 appropriate for the transport and communications protocols connecting CNI Service 121 and Implementation Service 131.

Further, if a given network allows suffixes to be appended to a short code, the CNI Service 121 is desirably configured to associate all or some of these possible "extended" short codes with a given Implementation Service 131. When CNI Service 121 receives a mobile originated SMS Message 200 where the "To" Field is one of these configured extended short codes, CNI Service 121 converts the mobile originated SMS Message 200 to a mobile originated iSMS Message 300 and forwards it to Application Service 131 previously configured with the given extended short code. This conversion produces mobile originated iSMS Message 300 appropriate for the transport and communications protocols connecting CNI Service 121 and Implementation Service 131.

Pre-configuring CNI Service 121 to associate addresses with data applications or Implementation Service 131 is not strictly necessary. For example, in some transport and communications protocols, such as email or IM, where the email or IM addresses in the To and From Fields are sufficient for CNI Service 121 to route messages appropriately, such configuration is not necessary. However in these cases address translation may be necessary. For example, Implementation Service 131 may communicate with CNI Service 121 using email. In this case, iSMS Messages 300 transmitted between Implementation Service 131 and CNI Service 121 will be email messages. This means that the To Fields 310 and From Fields 320 of these iSMS Messages 300 will be email addresses. For mobile terminated iSMS messages, CNI Service 121 will take these email addresses and "translate" them into suitable SMS Message To Fields 210 and From Fields 220. This can be done, for example, by converting the iSMS Message's To Field 310 to a mobile cell phone number and assigning a unique short-code plus some optional suffix for the iSMS Message's From Field 320.

Suppose that CNI Service 121 receives a mobile terminated email iSMS Message 300 with the To Field 310 set to <NUMBER>@messaging.sprintpcs.com and the From Field 320 set to ADDR1@implementationService.com. In this case, CNI Service 121 desirably generates a mobile terminated SMS Message 200 for transmission over the cellular network by setting the SMS Message's 200 To Field 210 to <NUMBER> and setting the SMS Message's 200 From Field 220 to some short code plus an appended suffix, e.g., BRFOO:00001. CNI Service 121 then transmits this mobile terminated SMS Message 200 to the SMS Client 111 associated with the user <NUMBER>.

When a mobile originated message in reply to this mobile terminated SMS Message 200 arrives, CNI Service 121 performs the "reverse address translation" and generates mobile originated iSMS Message 300 with email addresses as the To Field 310 and From Field 320. In the above example, user replies to the mobile terminated SMS Message 200 will have a To Field of BRFOO:00001 and From Field of <NUMBER>. CNI Service 121 will now generate a mobile originated iSMS Message 300 with the To Field 310 set to ADDR1@implementationService.com and the From Field 320 set to <NUMBER>@messaging.sprintpcs.com, and will mail this generated mobile originated iSMS Message 300. In this case, Implementation Service 131 desirably monitors a specific set of email-addresses on an email server and responds when messages arrive in the associated mailboxes.

Implementation Server 130 and Application Server 140 can be connected to each other via a dedicated leased line, an internet connection and/or any other suitable/desirable manner. Over this connection, Implementation Service 131 and the Application Service 141 communicate with each other utilizing various protocols. These protocols can be utilized in a synchronous or an asynchronous manner and can include HTTP, RMI, SOAP, or CORBA. Regardless of the exact protocol being used for communication between Implementation Service 131 and Application Service 141, Application SMS Messages (aSMS Messages) 400 are transmitted from Application Service 141 to Implementation Service 131 and Application Callbacks 500 are transmitted/invoked by Implementation Service 131 to/on Application Service 141.

Figure 4:
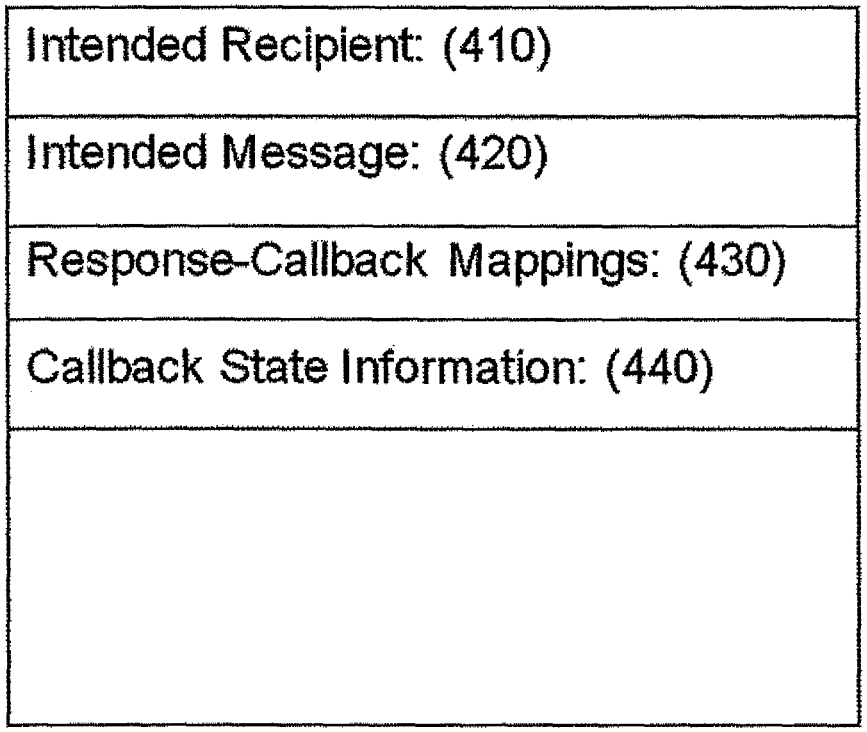
FIG. 4 is an illustration of the fields of an exemplary application SMS Message.

FIG. 4 shows the four fields of an aSMS Message.

A. Intended Recipient 410 Field:

Intended Recipient 410 field is used to communicate who a message should be delivered to. This may be the cellular telephone number of a mobile user or it may be some obfuscated information that Implementation Service 131 can utilize to obtain the cellular telephone number of the mobile user. For privacy reasons, it may be desirable to use only obfuscated information in Intended Recipient 410 field. This field may not be strictly required in all cases. For example, if Implementation Service 131 is invoking a callback on an Application Service 141 on behalf of a specific user in a synchronous manner, Application Service 141 may not need to transmit this information as Implementation Service 131 presumably already knows the intended recipient of the message.

B. Intended Message 420 Field:

Intended Message 420 field is the contents of a message. The Intended Message may be plain text or it may be parsed/extracted from content in various formats. For example if HTTP/HTML is used to connect Implementation Service 131 and Application Service 141, then Intended Message 420 may need to be extracted from HTML delivered by Application Service 141. For example, SMS Message's Message Field 230 may be extracted from HTML in a manner similar to how a text-browser represents HTML as text.

C. Response-Callback Mappings 430 Field:

Response-Callback Mappings 430 are used by Application Service 141 to tell Implementation Service 131 which Application Callback 500 to execute for a given user response to this aSMS message. There are different ways of registering callbacks based on the response text, including having one callback for all responses to a given message or having a separate callback for each of an enumerated set of responses to a given message, with a catch-all callback for responses not in the enumerated set. Response-Callback Mappings 430 may be represented in many different ways. For example, they may include explicit listings of possible user responses and callback functions or they may be parsed/extracted from content in various formats. For example, if HTTP/HTML is used to connect Implementation Service 131 and Application Service 141 then Response-Callback Mappings 430 may be extracted from the HTML delivered by Application Service 141. This may be done by looking at the possible actions that a text browser would allow on this message.

D. Callback State Information 440 Field:

Callback State Information 440 is used to communicate any state information that must be passed back to Application Service 141 when invoking a given Application Callback 500 so Application Service 141 can instantiate the appropriate internal state before executing the Application Callback 500. There are many different ways of representing Callback State Information 440. It may be some token that Implementation Service 131 passes back to Application Service 141 when invoking a callback. For example, if HTTP/HTML is used to connect Implementation Service 131 to Application Service 141, then cookies, rewritten URLs or hidden form fields may be used to represent Callback State Information 440.

Figure 5:
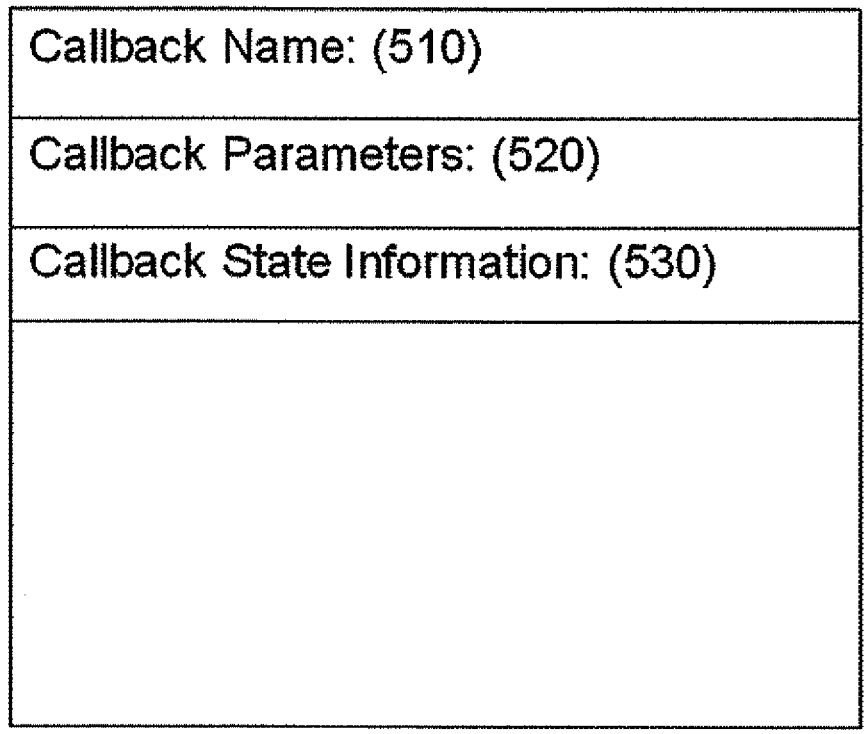
FIG. 5 is an illustration of the fields of an exemplary application callback.

FIG. 5 illustrates the three fields of an Application Callback 500.

A. Callback Name 510 Field:

Callback Name 510 is used to identify a specific action/callback on Application Service 141 that must be executed. There are many ways to represent Callback Name 510 based on the protocol used to connect Application Service 141 with Implementation Service 131. It may be an explicit function name to execute or it may be a URL to call. For example, if HTTP/HTML is used to connect Implementation Service 131 with Application Service 141, Callback Names 510 may be represented as URLs.

B, Callback Parameters 520 Field:

Callback Parameters 520 are any parameters that Implementation Service 131 must fill in before calling or invoking Application Callback 500. There are many ways to represent Callback Parameters 520 based on the protocol used to connect Application Service 141 to Implementation Service 131. It may be explicit function signatures or some other representation. For example, if HTTP/HTML is used to connect Implementation Service 131 with Application Service 141, Callback Parameters 520 may be represented as form fields that must be filled in before making a HTTP request.

C. Callback State Information 530 Field:

Callback State Information 530 is any information that Implementation Service 131 must fill in before calling or invoking Application Callback 500 so the Application Service 141 can instantiate the appropriate internal state. There are many ways to represent Callback State Information 530 based on the protocol used to connect Application Service 141 to Implementation Service 131. It may be some token that Application Service 141 shares with Implementation Service 131 or some other representation. For example, if HTTP/HTML is used to connect Implementation Service 131 with Application Service 141 Callback State Information 520 may be represented as cookies, rewritten URLs or hidden form fields that must be filled in before making a HTTP request.

Implementation Service 131 may be configured with keyword/address-to-application bindings. Users who wish to invoke applications via SMS can send messages containing known "keywords" to a known address associated with Implementation Service 131. This known address may be a short code, a short code with an appended suffix, a cellular telephone number, an email address or an IM address. Implementation Service 131, upon receiving a user message containing one of these configured known keywords or upon receiving a user message to one of these configured known addresses, invokes the proper Application Callback 500 within or to Application Service 141. In order for Implementation Service 131 to invoke the proper Application Callback 500, it stores keyword/address-to-application bindings. While how Implementation Service 131 is configured is implementation dependent, Application Service 141 can configure an Implementation Service 131 by setting up a keyword expression and binding that keyword to an Application Callback 500.

A Keyword Expression evaluates to true if the received user message contains the known keywords. For example, the Keyword Expression <split 1>="Movies" evaluates to true if the second word in a received user message is "Movies." While this is a simple example, a more complex example may be <split 1>="Movies|movies|Movie|movie." This expression evaluates to true if the second word in a received user message is either "Movies," "Movie," "movies" or "movie."

Applications Service 141 can send messages to mobile users in one of two ways. First, it can send a message to a mobile user in response to a Mobile Originated Message it receives. For example, a user can initiate an interaction with Application Service 141 by initiating a search for local coffee shops. Alternatively, Application Service 141 can send a message to the mobile user when some "external event" occurs. For example, an Application Service 141 may wish to send a mobile user a message three months after his last oil change.

Regardless of why Application Service 141 wishes to send a mobile terminated message to a mobile user, it always generates an aSMS Message 400 and forwards this message to Implementation Service 131. Implementation Service 131 stores any response-to-callback bindings associated with this aSMS Message 400 and selects and attaches a Token 340 to the iSMS message. How Implementation Service 131 selects one of these Tokens is implementation dependent. A simple implementation would just allocate a previously unused Token. However, this Token must be unique to the user/address combination, i.e. Implementation Service 131 does not currently have bindings configured for this "token" for this user/address combination. A more complex implementation could choose to reuse currently allocated tokens as long as the new response-callback bindings do not conflict with the existing response-callback bindings associated with the token for a given user/address combination. By conflict we mean that interpreting the contents of a reply to a given message would be ambiguous because at least two separate callbacks could match. For example, if a token already has response-callback bindings for the numbers '1', '2' and '3', the Implementation Service 131 cannot use this token to send another message that needs a response-callback binding for '1', '2', or '3' because, for example, when a reply of '1' is received the Implementation Service 131 would not know which callback to invoke. However, this token may be reused if the second message only contains response-callback bindings for 'A', 'B' and 'C'. While this example shows conflicts that occur because of exact matches (the response callback bindings were associated with the same string '1') it will be readily appreciated that conflicts could occur because the evaluation of regular expressions or some other function that results in the same value. It is important to note that Implementation Service 131 desirably uses the same token in different ways for different user/address combinations. Implementation Service 131 then generates a mobile terminated iSMS Message 300, with the newly selected token "attached" to it, representing the mobile terminated aSMS message, and forwards this message to the intended user's CNI Service 121. CNI Service 121 in turn generates a counterpart mobile terminated SMS Message 200, by modifying/translating, if necessary, the contents of the received mobile terminated iSMS message 300. CNI Service 121 then forwards the newly created mobile terminated SMS Message 200 to the mobile user's SMS Client 111.

When a user chooses to reply to a received SMS Message 200 he selects the reply option on his SMS Client 111. SMS Client 111, in response, displays a reply message composition screen with the To Field 210 of this new mobile originated SMS Message 200 populated with data from the From Field 220 of the mobile terminated SMS Message 200 the user is responding to. The user fills in the Message Field 230 of this new mobile originated SMS Message 200 using this reply message composition screen and selects the send option on SMS Client 111. SMS Client 111 then attaches the "token" if present and forwards this new mobile originated SMS Message 200, with the attached token, to the user's cellular network's CNI Service 121. CNI Service 121 converts the new mobile originated SMS Message 200 to a new mobile originated iSMS Message 300 and forwards it to the appropriate Implementation Service 131 based on To Field 310 of the new mobile originated iSMS Message 300. The conversion process produces new mobile originated iSMS Message 300 appropriate for the transport and communications protocols connecting CNI Service 121 and Implementation Service 131. Implementation Service 131 receives iSMS Message 300 from CNI Service 121 and based on its To Field 310, From Field 320 and the Message Field 330 and if available Token 340 identifies the appropriate Application Service 141 and the appropriate Application Callback 500 to invoke. Implementation Service 131 then fills in the appropriate Callback Name 510, Callback Parameters 520 and Callback State Information 530 and invokes the identified Application Callback 500. In response Application Service 141 invokes the appropriate internal state and executes the appropriate application logic. If, in response, Application Service 141 wishes to send a Mobile Terminated aSMS Message 400, it generates such Message 400 and forwards it to Implementation Service 131. The process then repeats.

Two interaction diagrams that detail how the present invention is used in "user-initiated" and "application-initiated" scenarios are described below.

Figure 6:
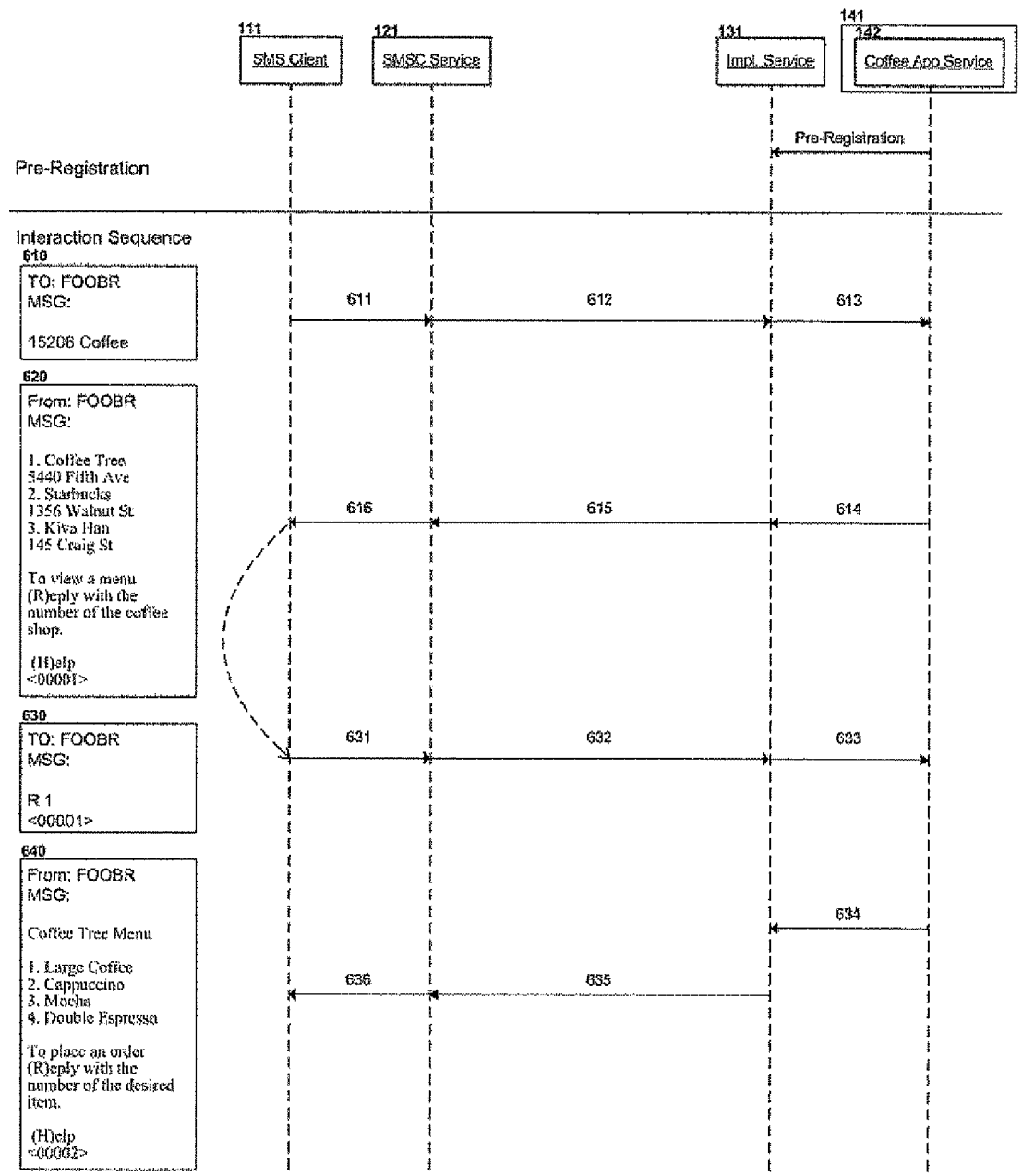
FIG. 6 is a flow diagram of a "user-initiated" interaction sequence in accordance with the present invention.

With reference to FIG. 6, a "user-initiated" interaction sequence is shown. Before interactions start, various Application Services 141 register with the Implementation Service 131. While only one Application Service 141 is illustrated in FIG. 1, it is envisioned that a plurality of Application Services may be provided and connected to Implementation Service 131. In this example, three Application Services 141 register with the Implementation Service 131 associated with the short code FOOBR. They do this by configuring the Implementation Service 131 with keyword bindings that can be used to initiate applications. For the sake of this discussion, the following illustrative bindings are presented:

TABLE 1

| Reply-to Address | User | Reply | Method | Callback |
|---|---|---|---|---|
| FOOBR | * | <split 1> = Coffee | Post | URL: http://www.coffee.com/start.jsp<br>POST Param 1: user = <USER_IDENTIFIER><br>POST Param 2: zip = <split 0> |
| FOOBR | * | <split 1> = Movies | Post | URL: http://www.movies.com/start.jsp<br>POST Param 1: user = <USER_IDENTIFIER><br>POST Param 2: zip = <split 0> |
| FOOBR | * | <split 1> = Food | Post | URL: http://www.food.com/start.jsp<br>POST Param 1: user = <USER_IDENTIFIER><br>POST Param 2: zip = <split 0> |

However, the format or content of this table is not to be construed as limiting the invention.

These bindings tell Implementation Service 131 which callback to execute in response to received mobile originated Messages. The Coffee Application's bindings are shown in the first row of Table 1. The information contained in this row tells Implementation Service 131 what to do when it receives a mobile originated message to the address FOOBR, where the second word of the received message is ('<split 1>=Coffee') Coffee. Specifically, it tells Implementation Service 131 to perform a post operation on the URL http://www.coffee.com/start.jsp. Furthermore, in performing this post operation, the Implementation Service 131 should fill in the parameters user and zip.

In addition to Application Services 141 registering with Implementation Service 131, the reply-to-address space of Implementation Service 131 must be configured with CM Service 121. In this example it is assumed that the cellular networks connecting SMS Clients 111 to CNI Service 121 support short codes and the short code FOOBR is associated with the Implementation Service 131 This means that CNI Service 121 will forward all mobile originated SMS Messages 200 where the To Field is FOOBR to Implementation Service 131. Further, Implementation Service 131 attaches "tokens" to messages transmitted to SMS Clients 111 to implement session management over SMS as explained herein.

Referring to FIG. 6, once the system has been thus configured, the sequence of events that occurs when a user sends a message containing "<zip> COFFEE" to the address FOOBR is as follows:

Step 610: User Initiates Transaction: A mobile user initiates a transaction by using his SMS Client 111 to send the following mobile originated message SMS 200 to a known address with a known keyword and zip code. He may be made aware of this address and keyword via a number of different mechanisms—for example, a sign at a location or advertising and so forth. Assuming that the known address is FOOBR, the known keyword is "Coffee", and the zip code is to be associated with "15206", below is shown how a user initiates the interaction:

To: FOOBR
MSG: 15206 Coffee

Step 611: SMS Message Transmission: The SMS mobile originated message 200 of step 610 is forwarded to the user's cellular network's CNI Service 121, along with the user's cellular telephone number, which populates the "From Field" 220 of the SMS Message 200, when the user presses the "Send" key on SMS Client 111. Because this is a new mobile initiated message, there is no Token 240 for the SMS Client 111 to extract and append to this mobile initiated SMS message 200.

Step 612: CNI Service Processing: In response to receiving the mobile originated SMS Message 200 transmitted in step 611, CNI Service 121 creates the appropriate mobile originated iSMS Message 300 and forwards it to Implementation Service 131 based on the To Field 310 of the thus generated mobile originated iSMS Message 300. Because no address translation is necessary, CNI Service 121 forwards the thus generated mobile originated iSMS Message 300 to the Implementation Service 131 previously associated with the address FOOBR.

It is envisioned that more than one Implementation Service 131 may be connected to CNI Service 121 and that each said Implementation Service 131 may have more than one Application Service 141 connected thereto. Accordingly, the illustration in FIG. 1 of only one Implementation Service 121 connected to CNI Service 121 and one Application Service 141 connected to Implementation Service 131, is, therefore, not to be construed as limiting the invention.

Step 613: Implementation Service Processing Inbound: Implementation Service 131 receives the incoming mobile originated iSMS message 300 and based on the To Field 310, the From Field 320, the Message Content 330 and, if present, Token 340, of the received iSMS message 300 identifies the appropriate Application Callback 500 to invoke. Recall that these Callbacks were previously configured in the registration phase as shown above in Table 1. For the present example, the identified Application Callback 500 information is:

URL: http://www.coffee.com/start.jsp
POST Param 1: user = <USER_IDENTIFIER>
POST Param 2: zip = <split 0>

Implementation Service 131 now identifies the values of the various needed parameters. For the present example, Implementation Service 131 inserts the cellular telephone number or some obfuscated user identifier associated with cellular telephone number of the user in the USER_IDENTIFIER field of the Application Callback 500 for use by the application. Implementation Service 131 also extracts the first word or string in the received SMS message, i.e., 15206, and associates this word or string with the zip parameter.

Implementation Service 131 now performs an HTTP POST or GET to Application Service 141 to initiate the appropriate Application Callback 500. For the present example, Implementation Service 131 will perform an HTTP POST operation on the URL http://www.coffee.com/start.jsp. The parameters passed to Application Service 141 as a part of this POST operation will be user (set to USER_IDENTIFIER, in this example the user's cellular telephone number, e.g., 412-555-5394) and zip (set to the first word or string in the received user message text). Finally, Implementation Service 131 inserts any cookies that may be needed. In this case there are no cookies to insert. The POST operation may look like:

```
POST /start.jsp HTTP/1.1
Host: www.coffee.com
User-Agent: SMaSh text browser/5.0
Accept: text/xml
Accept-Language: en-us;q=0.50
Accept-Encoding: gzip, deflate, compress;q=0.9
Accept-Charset: ISO-8859-1, utf-8;q=0.66, *;q=0.66
Keep-Alive: 200Connection: keep-alive
Content-Type: application/x-www-form-urlencoded
Content-Length: 25
user=4125555394
zip=15206
```

However, the format or content of this POST is not to be construed as limiting the invention.

Step 614: Application Service Processing: A Coffee Application Service 142 hosted by Application Service 141, in response to the above HTTP Post operation initiated by Implementation Service 131, instantiates the appropriate internal state and executes the appropriate application logic. In this example, Coffee Application Service 142 creates a new web application session for the user associated with "USER_IDENTIFIER" with the appropriate internal state and executes the application logic contained in the web page start.jsp. Executing start.jsp causes a mobile terminated aSMS message 400 to be generated. In this example, the execution of the start.jsp page is synchronous, so it is not necessary for Coffee Application Service 142 to pass back data regarding the Intended Recipient 410. Below shown is an example of what this mobile terminated aSMS message 400 may look like.

```
HTTP/1.1 200 OK
DATE: Wed, 1 Jun 2005 00:00:00 GMT
Cache-Control: max-age=31536000, must-revalidate
Set-Cookie: sessionid=987654321; expires=Fri, 01 Jun 2007 10:00:00
GMT; path=/; domain=www.coffee.com
Connection: close
Content-type: text/html
<html>
<head><title>Coffee search main page</title></head>
    <body>
        <form action="http://www.coffee.com/storeselect.jsp"
name="store" method="post" id="store_select">
            <select name="store" id="store_select">
            <option value="1">Coffee Tree<br />5440 Fifth Ave.</option>
            <option value="2">Starbucks<br />1356 Walnut Street</option>
            <option value="3">Kiva Han<br />145 Craig Street</option>
            </select>
            <label for="store_select">To view a menu (R)eply with the
number of the coffee shop.</label>
        </form>
        <br/>
        <a
href=http://www.coffee.com/help/Help_Store_Select.html>(H)elp</a>
    </body>
</html>
```

However, the format or content of this message is not to be construed as limiting the invention.

Step 615: Implementation Service Processing Outbound: Implementation Service 131 receives the mobile terminated aSMS Message 400 from Coffee Application Service 142 including the HTTP reply in response to executing the Application Callback 500 in step 613. Implementation Service 131 then creates a mobile terminated iSMS Message(s) 300 for delivery to the intended recipient's CNI Service 121 and generates and stores any necessary response-callback bindings. As a part of this process, Implementation Service 131 selects and appends a Token 340 with the value "00001" to the iSMS message. How Implementation Service 131 selects the value of the token is implementation dependent. A simple implementation would just allocate a previously unused token that is unique to the user/address combination, i.e. Implementation Service 131 does not currently have bindings configured for this "token" for this user/address combination. A more complex implementation could choose to reuse currently allocated tokens as long as the new response-callback bindings do not conflict with the existing response-callback bindings associated with the token. In this example we assume a simple implementation that will allocate currently unused tokens. Specifically, the system will simply increment the "token". So it could start with 00000 and then go to 00001 and so forth. Once it gets to 99999 it can begin to reuse the tokens starting at 00000 again.

Once Implementation Service 131 has created the appropriate mobile terminated iSMS Message(s) 300, it identifies the appropriate CNI Service 121 for the mobile user, i.e. the CNI Service 121 that services the cellular network for the user. It then forwards the generated mobile terminated iSMS message(s) 300 to it. Below is shown what this message may look like for the current example, (the "token" is displayed in < >—it is intended that the SMS Client 111 will not display the token to the user):

```
To: 4125555394
From: FOOBR
Message:
1. Coffee Tree
5440 Fifth Ave.
2. Starbucks
1356 Walnut Street
3. Kiva Han
145 Craig Street
To view a menu (R)eply with the
number of the coffee shop.
(H)elp
<00001>
```

However, the specific format or content of this message is not to be construed as limiting the invention.

Table 2 below shows what the response-callback bindings generated by Implementation Service 131 in response to receiving the message of step 614 may look like for the present example.

TABLE 2

| Reply-to Address | User | Token | Reply | Method | Callback |
|---|---|---|---|---|---|
| FOOBR | 4125555394 | 00001 | <split 0> = R | POST | URL: http://www.coffee.com/storeselect.jsp<br>Cookie: sessionid = 987654321<br>POST Param 1: store = <split 1> |
| FOOBR | 4125555394 | 00001 | <split 0> = H | GET | URL: http://www.coffee.com/help/Help_Store_Select.html<br>Cookie: sessionid = 987654321 |

However, the format or content of this table is not to be construed as limiting the invention.

Step 616: CNI Service Processing Outbound: CNI Service 121 transforms the received mobile terminated iSMS Message(s) 300 into a mobile terminated SMS Message(s) 200 that can be delivered to mobile clients. This typically involves converting the iSMS Message's To Field and From Field into "valid" SMS addresses. In this example, however, because the iSMS Message's To Field is a mobile phone number and the From Field is a short code no transformation is needed. Once the transformation (if required) is complete, CNI Service 121 locates the mobile device within the cellular network and transmits the newly created mobile terminated SMS Message(s) 200 to the appropriate SMS Client 111.

Step 620: SMS Client User View: SMS Client 111 now displays the received mobile terminated SMS Message. Below, is shown what the received message may look like for the current example. It is intended that the SMS Client 111 will not display the Token 240 associated with this message to the user. For the purposes of illustration, we show the token embedded in < > below.

```
From: FOOBR
MSG:
  1.   Coffee Tree
       5440 Fifth Ave.
  2.   Starbucks
       1356 Walnut Street
  3.   Kiva Han
       145 Craig Street
To view a menu (R)eply with the
number of the coffee shop.
(H)elp
<00001>
```

However, the specific format or content of this message is not to be construed as limiting the invention.

Step 621: SMS Client User Response: The user replies to the mobile terminated SMS message 200 of step 620 by sending a new mobile originated SMS message 200 in step 630. While viewing the mobile terminated SMS message 200 of step 620, the user selects the reply option on his SMS Client 111. SMS Client 111 displays a new SMS Message composition screen. Furthermore, SMS Client 111 automatically populates the "To Field" 210 and the Token 240 with the From Field 220 and the Token Field 240 of the mobile terminated message 200 in step 620. For the current example, the message composition screen when the user selects the reply option may look like:

```
To: FOOBR
MSG:
```

However, the specific format and content of this message composition screen is not to be construed as limiting the invention.

The user then enters the text "R1", for example, into Message Field 230 of the SMS Message of step 630:

```
To: FOOBR
MSG: R 1
```

Step 631: SMS Message Transmission: The mobile originated SMS message 200 of step 630 including the user entered text and the Token 240 in this case 00001, is then forwarded to the user's cellular network's CNI Service 121 when the user presses "Send."

Step 632: CNI Service Processing: CNI Service 121 creates the appropriate mobile originated iSMS Message 300 and forwards this mobile originated iSMS message 300 to the appropriate Implementation Service 131 based on the To Field 310 of this mobile originated iSMS Message 300. In this example, the received mobile originated SMS Message 200 is converted to the appropriate mobile originated iSMS Message 300 and forwarded to the Implementation Service 131 previously associated with the short code FOOBR. No address translation is necessary.

Step 633: Implementation Service Processing Inbound: Based on the incoming mobile originated iSMS Message 300, Implementation Service 131 identifies and executes the appropriate Application Callback 500 on the appropriate Application Service 141. Recall that Implementation Service 131 was configured in step 615 with the Application Callbacks shown in Table 2 for user responses to message 620. Upon receiving the user message including the reply-to address FOOBR and the Token 240 with value 00001, Implementation Service 131 identifies the appropriate callback information (Table 2). For the present example the callback information is:

```
URL: http://www.coffee.com/storeselect.jsp
Cookie: sessionid = 987654321
POST Param 1: store = <split 1>
```

Implementation Service 131 then parses the received mobile originated iSMS message 300 and identifies the values of the various needed parameters. For the present example, it parses the received user message text in order to extract the store identifier, which is the second word (or character) in the message. For the present example, this will be "1." Implementation Service 131 now having identified the appropriate Application Callback 500, callback parameters and callback state information now performs the appropriate HTTP POST or GET operation. For the present example, Implementation Service 131 performs a HTTP POST operation on the URL http://www.coffee.com/storeselectjsp. The parameter passed to Coffee Application Service 142 as a part of this POST operation will be the store identifier "1". Finally, Implementation Service 131 inserts any cookies that may be needed. In this case it will insert the cookie "sessionid" set to "987654321." The POST operation may look like:

```
POST /storeselect.jsp HTTP/1.1
Host: www.coffee.com
User-Agent: Mozilla/5.0 (Windows; U; Windows NT 5.1;
en-US; rv:1.2)
Gecko/20021126
Accept: text/xml
Accept-Language: en-us;q=0.50
Accept-Encoding: gzip, deflate, compress;q=0.9
Accept-Charset: ISO-8859-1, utf-8;q=0.66, *;q=0.66
Keep-Alive: 200Connection: keep-alive
Content-Type: application/x-www-form-urlencoded
Cookie: sessionid=987654321;
Content-Length: 7
store=1
```

However, the specific format and content of this POST is not to be construed as limiting the invention.

Step 634: Coffee Application Service Processing: Coffee Application Service 142, in response to the foregoing HTTP request initiated by Implementation Service 131, instantiates the appropriate state and executes the appropriate application logic associated with Application Callback 500. In this example, Coffee Application Service 142 re-instantiates the state associated with its sessionid 987654321 and now, with the appropriate internal state, executes the application logic contained in storeselect.jsp. Executing storeselect.jsp generates a new aSMS Message 400. Below we show what this message may look like.

```
HTTP/1.1 200 OK
DATE: Wed, 1 Jun 2005 00:00:00 GMT
Cache-Control: max-age=31536000, must-revalidate
Connection: close
Content-type: text/html
<html>
<head><title>Coffee search main page</title></head>
<body>
<form action="http://www.coffee.com/itemselect.jsp"name="item"
method="post" id="item_select">
Coffee Tree Menu <br/>
<input type="hidden" name="store" value="CT54" />
<select name="item" id="item_select">
<option value="1">Large Coffee</option>
<option value="2">Cappuccino</option>
<option value="3">Mocha</option>
<option value="4">Double Espresso</option>
</select>
<label for="item_select">To place an order (R)eply with the
number of the desired item. </label>
</form>
```

-continued

```
<a href=http://www.coffee.com/help/Help_Order.html>(H)elp</a>
</body>
</html>
```

However, the specific format and content of this message is not to be construed as limiting the invention.

Step 635: Implementation Service Processing Outbound: Implementation Service 131 receives the aSMS Message 400 in response to execution of the HTTP Post operation in step 634. It then creates corresponding mobile terminated iSMS Message(s) 300 for delivery to the intended recipient's CNI Service 121 and generates and stores any necessary response-callback bindings shown in Table 3 below. As a part of this process, Implementation Service 131 selects a new Token 340 <00002> for the user/address combination. This "token" will be added to the iSMS Message in a predefined manner. How Implementation Service 131 selects this Token 340 is implementation dependent. A simple implementation would just allocate a previously unused token that is unique to the user/address combination, i.e. Implementation Service 131 does not currently have bindings configured for this "token" for this user/address combination. A more complex implementation could choose to reuse currently allocated tokens as long as the new response-callback bindings do not conflict with the existing response-callback bindings associated with the token. In this example we assume a simple implementation that will allocate currently unused tokens.

Once Implementation Service 131 has created the appropriate mobile terminated iSMS Message(s) 300, it identifies the appropriate CNI Service 121 for the mobile user, i.e. the CNI Service 121 that services the cellular network for the user. It then forwards the thus generated mobile terminated iSMS message(s) 300 to it. Below is shown what this message may look like for the current example, (the "token" is displayed in < >—it in intended that the SMS Client will likely hide the token from the user):

```
To: 4125555394
From: FOOBR
Message:
Coffee Tree Menu
1. Large Coffee
2. Cappuccino
3. Mocha
4. Double Espresso
To place an order (R)eply with the
number of the desired item.
(H)elp
<00002>
```

However, the specific format and content of this message is not to be construed as limiting the invention.

Table 3 below shows what response-callback bindings generated by Implementation Service 131 may look like for the present example.

TABLE 3

| Reply-to Address | User | Token | Reply | Method | Callback |
|---|---|---|---|---|---|
| FOOBR | 4125555394 | 00002 | <split 0> = R | POST | URI: http://www.coffee.com/itemselect.jsp Cookie: sessionid = 987654321 |

TABLE 3-continued

| Reply-to Address | User | Token | Reply | Method | Callback |
|---|---|---|---|---|---|
| FOOBR | 4125555394 | 00002 | <split 0> = H | GET | POST Param 1: store = CT54<br>POST Param 2: item = <split 1><br>URI:<br>http://www.coffee.com/help/Help_Order_Coffee.html<br>Cookie: sessionid = 987654321 |

However, the format or content of this table is not to be construed as limiting the invention.

Step 636: CNI Service Processing Outbound: CNI Service 121 transforms the received mobile terminated iSMS Message(s) 300 into mobile terminated SMS Message(s) 200 that can be delivered to mobile clients. This typically involves converting each mobile terminated iSMS Message's To Field and From Field into "valid" SMS addresses. In this example, however, because the iSMS Message's To Field is a mobile phone number and the From Field is a short code reply-to-address FOOBR, no transformation is needed. Once the transformation (if required) is complete, CNI Service 121 locates the user's mobile device within the cellular network and transmits each newly created mobile terminated SMS Message 200 to the user's SMS Client 111.

Step 640: SMS Client User View: The user's SMS Client 111 now displays the mobile terminated SMS Message 200 transmitted in step 636. The From Field 220 for this message is populated with the reply-to-address FOOBR:00002 generated by Implementation Service 131 in step 636. Below, is shown what the received message may look like for the current example. It is intended that the SMS Client 111 will not display the Token 240, associated with this SMS Message 200, to the user. For the purposes of illustration, we show the token embedded in < > below.

```
From: FOOBR
Message:
Coffee Tree Menu
1. Large Coffee
2. Cappuccino
3. Mocha
4. Double Espresso
To place an order (R)eply with the
number of the desired item.
(H)elp
<00002>
```

Replies to this message are handled via the same method discussed above in connection with FIG. 6 starting at step 621 utilizing the response-callback bindings shown in Table 3 and the new token <00002> in replacement of the callback bindings shown in Table 2 and the token <00001> respectively.

Figure 7:
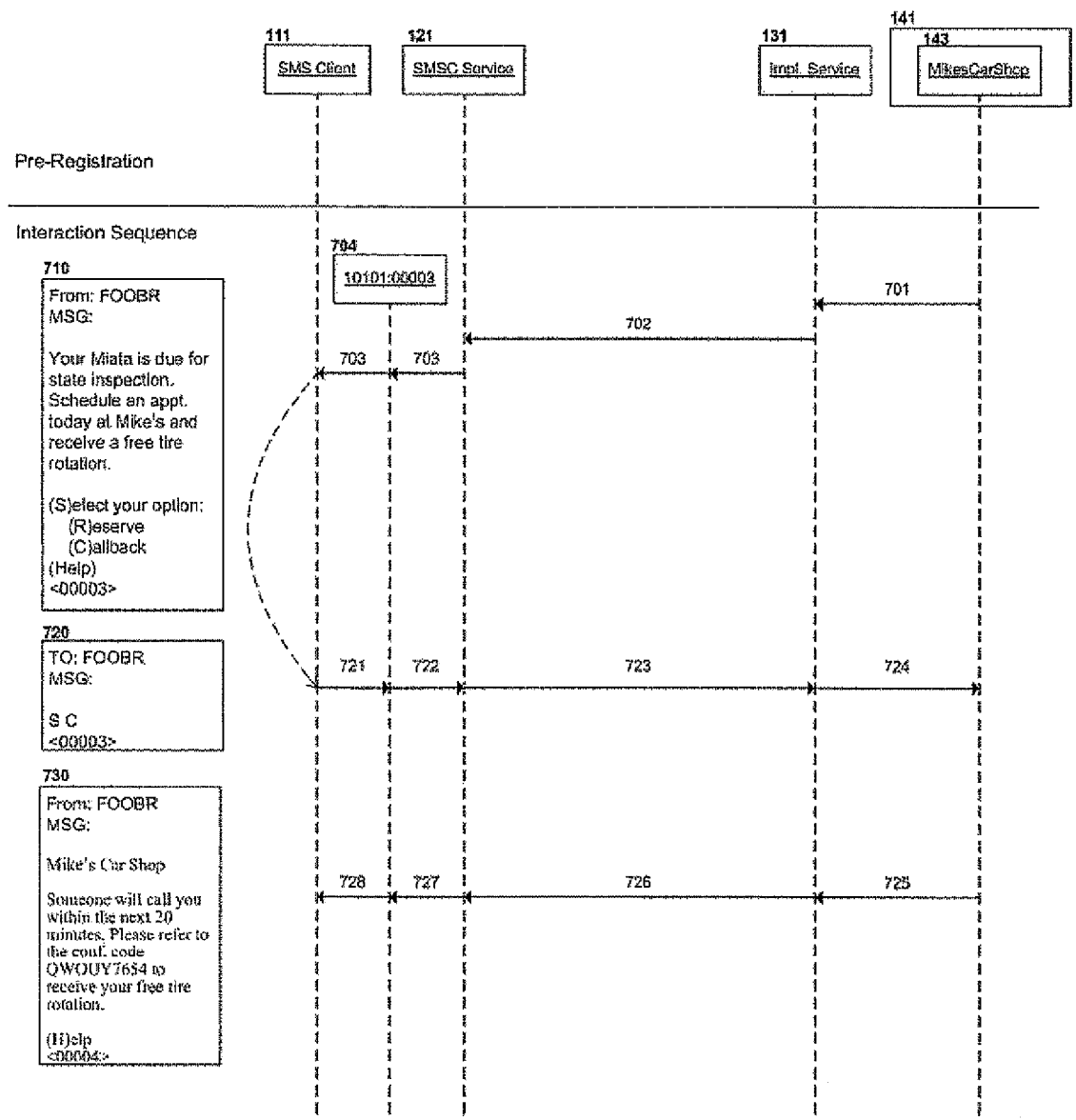
FIG. 7 is a flow diagram of a "application initiated" interaction sequence in accordance with the present invention.

With reference to FIG. 7 an "application initiated" interaction sequence will now be described. This sequence is described using, for illustration purposes, a sample application that wishes to remind a user that his car needs to be inspected. For this example no registration process is needed. However, if Mike's Car Shop Application Service 143 hosted by application service 141 had usage scenarios that could be initiated by users sending mobile originated SMS Messages 200, a registration process would be necessary. While the previous example assumed that the HTTP/HTML protocol was used for communications between Implementation Service 131 and Coffee Application Service 142, this example assumes that a XML based protocol is used for communications between Implementation Service 131 and Mike's Car Shop Application Service 143. This XML protocol is provided strictly as an example for explanation purposes. It will be appreciated that other suitable and/or desirable communications protocols that presently exist or which may be developed are still within the scope and spirit of the present embodiment.

In this example, assume that CNI Service 121 and Implementation Service 131 communicate with each other using email. As a result CNI Service 121 does not need to be explicitly configured with the reply-to-address for Implementation Service 131. It is assumed that Implementation Service 131 will receive all email messages addressed to ADDR@MIKESSHOP.COM. Implementation Service 131 will attach "tokens" to messages transmitted to SMS Clients 111 to implement session management over SMS as explained herein.

With reference to FIG. 7 an "application initiated" interaction sequence follows:

Step 701: Mike's Car Shop Application Processing: The Mike's Car Shop Application Service 143, in response to some external trigger (for example a timer), wishes to send a message to a mobile user. As a result, it generates an aSMS Message 400. This message may look like:

```
<SMSMessage>
<To telephoneNumber='4125555394'/>
<Expiration time = '9:00 PM July 28 2005' />
<Text>Your Miata is due for State Inspection. Schedule an appt.
today at Mike's and receive a free tire rotation.
(S)elect your option:
(R)eserve
(C)allback
(H)elp
</Text>
<Responses>
<Response replyTxt='S R'
method='StartMikesReservationSystem("4125555394")' />
<Response replyTxt='S C'
method='HaveMikesCallCustomerBack("4125555394")' />
<Response replyTxt='H'
method='HelpMikesCustomer("4125555394")' />
<Response replyTxt='*'
method='HelpMikesCustomer("41265555394")' />
<Responses/>
</SMSMessage>
```

However, the specific format and content of this message is not to be construed as limiting the invention.

In this example, the "To" tag in the XML, is used to indicate the Intended Recipient 410 of the aSMS Message 400. Because Mike's Car Shop Application Service 143 initiates this transaction, it never receives a USER_IDENTIFIER from Implementation Service 121 as in the previous interaction sequence. As a result, Mike's Car Shop Application Service 143 must supply a unique user identifier associated with the "To" tag to Implementation Service 131. This unique user identifier may be the cellular telephone number of the intended recipient. Alternatively, it may be some obfuscated identifier that is known to both the Implementation Service 131 and the Mike's Car Shop Application Service 143 that uniquely identifies a particular mobile user or a group of mobile users. If an obfuscated user identifier is used, Implementation Service 131 must know how to find the mobile user's cellular telephone number based on this identifier.

Step 702: Implementation Service Processing Outbound: Implementation Service 131 receives the aSMS Message 400 and creates a mobile terminated iSMS Message(s) 300 for delivery to the intended recipient and generates and stores any necessary response-callback bindings shown in Table 4 below.

As a part of this process Implementation Service 131 selects and appends a Token 340 with value 00003 to the iSMS message 300. How Implementation Service 131 selects this token is implementation dependent. A simple implementation would just allocate a previously unused token that is unique to the user/address combination, i.e. Implementation Service 131 does not currently have bindings configured for this "token" for this user/address combination. A more complex implementation could choose to reuse currently allocated tokens as long as the new response-callback bindings do not conflict with the existing response-callback bindings associated with the token. In this example we assume a simple implementation that will allocate currently unused tokens.

Once Implementation Service 131 has created the appropriate mobile terminated iSMS Message(s) 300, it identifies the appropriate CNI Service 121 for the mobile user, i.e. the CNI Service 121 that services the cellular network for the user. It then forwards the generated mobile terminated iSMS Message(s) 300 to it. Below is shown what this message may look like for the current example, (the "token" is displayed in < >—it in intended that the SMS Client not display this token to the user):

```
To: 4125555394
From: ADDR@MIKESSHOP.COM
Message:
Your Miata is due for state
inspection. Schedule an appt.
today at Mike's and receive a
free tire rotation.
(S)elect your option:
    (R)eserve
    (C)allback
(H)elp
<00003>
```

However, the specific format and content of this message is not to be construed as limiting the invention.

The response-callback bindings generated and stored by Implementation Service 131 may look like this:

TABLE 4

| Reply-to Address | User | Token | Reply | Method | Callback |
|---|---|---|---|---|---|
| ADDR@MIKESSHOP.COM | 4125555394 | 00003 | \<response\> = "S R" | Method Call | StartMikesReservationSystem(String user) user = "4125555394" |
| ADDR@MIKESSHOP.COM | 4125555394 | 00003 | \<response\> = "S C" | Method Call | HaveMikesCallCustomerBack(String user) user = "4125555394" |
| ADDR@MIKESSHOP.COM | 4125555394 | 00003 | \<response\> = "H" | Method Call | HelpMikesCustomer(String user) user = "4125555394" |
| ADDR@MIKESSHOP.COM | 4125555394 | 00003 | \<response\> = "*" | Method Call | HelpMikesCustomer(String user) user = "4125555394" |

However, the format or content of this table is not to be construed as limiting the invention.

Step 703: CNI Service Processing Outbound: CNI Service 121 transforms the received mobile terminated iSMS Message(s) 300 into a mobile terminated SMS Message(s) 200 that can be delivered to mobile clients. This typically involves converting the mobile terminated iSMS Messages' To and From Fields into "valid" SMS addresses. In this example, CNI Service 121 assigns the email address ADDR@MIKESSHOP.COM the following short code with appended suffix: 10101:00003. This new address is represented as an object 704 in FIG. 7 in order to show its lifespan. In this example, no transformation is needed for the To Field as it is already a valid mobile phone number. Once the transformation (if required) is complete, CNI Service 121 locates the mobile device within the cellular network and transmits the newly created mobile terminated SMS Message 200 to the mobile device.

Step 710: User Receives Message: The user's SMS Client 111 now displays the received mobile terminated SMS Message 200. The From Field 220 for this message is the one generated by CNI Service 121 in step 704. It is intended that the SMS Client 111 will not display the Token 240, associates with this SMS Message 200, to the user. For the purposes of illustration, we show the token embedded in < > below.

```
From:10101:00003
Message:
Your Miata is due for state
inspection. Schedule an appt.
today at Mike's and receive a
free tire rotation.
(S)elect your option:
    (R)eserve
    (C)allback
(H)elp
<00003>
```

However, the specific format and content of this message is not to be construed as limiting the invention.

Step 721: User replies to Received Message: The user replies to this mobile terminated SMS message 200 of step 710 by sending a new mobile initiated SMS message in step 720. While viewing the mobile terminated SMS message of step 710, the user selects the reply option on his SMS Client 111. The SMS Client 111 also displays a new SMS Message composition screen in step 720 and automatically populates the To Field 210 and the Token 240 of the new message with the From Field 220 and the Token 240 of message 710 the user was viewing. When the user selects the reply (R) option while viewing message 720, the SMS message composition screen shows:

---
To:10101:00003
Message:
    Step 721: User Response: The user responds with "S C":
To:10101:00003
Message: S C
---

However, the specific format and content of this message and reply are not to be construed as limiting the invention.

The mobile originated SMS message 200, including the user entered text and the Token 240, in this case 00003, is then forwarded to the user's cellular network's CNI Service 121 when the user presses "Send."

Step 722: CNI Service Address Processing Inbound: As previously explained, the address object simply passes the message of step 721 through to CNI Service 121 for processing.

Step 723: CNI Service Processing Inbound: CNI Service 121 forwards the mobile originated SMS message 200 of step 721 to the appropriate location based on the To Field 210 of the message. In this example, the To Field 210 is 10101:00003. CNI Service 121 knows that for this user, 10101:00003 is associated with the email address ADDR@MIKESSHOP.COM. So the mobile originated SMS Message 200 of step 721 is converted to a new mobile originated iSMS Message 300 and forwarded to the email address ADDR@MIKESSHOP.COM, which is monitored by Implementation Service 131.

Step 724: Implementation Service Processing Inbound: Recall that Implementation Service 131 was configured in step 702 with Application Callbacks 500 for user responses to Message 710 (Table 4). Upon receiving the new mobile originated iSMS message 300, Implementation Service 131 identifies the appropriate callback information. For the present example, the callback information is:

---
HaveMikesCallCustomerBack(String user)
User = "4125555394"
---

Implementation Service 131 then invokes the following application callback 500 to Mike's Car Shop Application Service 143:

HaveMikesCallCustomerBack("4125555394").

Step 725: Mike's Car Shop Application Processing: Mike's Car Shop Application Service 143, in response to Implementation Service's 131 application callback 500, instantiates the appropriate state and executes the appropriate application logic associated with the application callback 500. In this example, Mike's Car Shop Application Service 143 executes the method HaveMikesCallCustomerBack("4125555394").

Mike's Car Shop Application Service 143, in response to the received application callback 500 of step 725, generates a new aSMS Message 400. The message may look like this:

---
<SMSMessage>
<To telephoneNumber='4125555394'/>
<Expiration time = '9:00PM, July 28 2005'/>
<Text>Mike's Car Shop
Someone will call you within
the next 20 minutes.
Please refer to the conf.
code QWOUY7654 to receive
your free tire rotation.
(H)elp
</Text>
<Responses>
<Response replyTxt='H' method='HelpMikesCustomer("4125555394")'/>
<Response replyTxt='*' method='HelpMikesCustomer("4125555394")'/>
<Responses/>
</SMSMessage>
---

However, the specific format and content of this message is not to be construed as limiting the invention.

Step 726: Implementation Service Processing Outbound: Implementation Service 131 receives the new aSMS Message 400 and creates there from a mobile terminated iSMS Message(s) 300 for delivery to the intended recipient and generates and stores any necessary response-callback bindings shown in Table 5 below.

As a part of this process, Implementation Service 131 selects and inserts token 00004 into Token Field 340 of iSMS message 300. How Implementation Service 131 selects this token is implementation dependent. A simple implementation would just allocate a previously unused token that is unique to the user/address combination, i.e. Implementation Service 131 does not currently have bindings configured for this "token" for this user/address combination. A more complex implementation could choose to reuse currently allocated tokens as long as the new response-callback bindings do not conflict with the existing response-callback bindings associated with the token. In this example we assume a simple implementation that will allocate currently unused tokens.

Once Implementation Service 131 has created the appropriate mobile terminated iSMS Message 300, it identifies the appropriate CNI Service 121 for the mobile user, i.e. the CNI Service 121 that services the cellular network of the user. It then forwards the generated mobile terminated iSMS Message 300 to it. Below is shown what this message may look like for the current example, (the "token" is displayed in < >—it in intended that the SMS Client will likely hide the token):

---
To: 4125555394
From: ADDR@MIKESSHOP.COM
Message:    Mike's Car Shop
Someone will call you within the
next 20 minutes. Please refer to the
conf. code QWOUY7654 to
receive your free tire rotation.
(H)elp
<00004>
---

However, the specific format and content of this message is not to be construed as limiting the invention.

The response-callback bindings generated and stored by Implementation Service 131 may look like this:

TABLE 5

| Reply-to Address | User | Token | Reply | Method | Callback |
|---|---|---|---|---|---|
| ADDR@MIKESSHOP.COM | 4125555394 | 00004 | \<response\> = "H" | Method Call | HelpMikesCustomer(String user) user = "4125555394" |
| ADDR@MIKESSHOP.COM | 4125555394 | 00004 | \<response\> = "*" | Method Call | HelpMikesCustomer(String user) user = "4125555394" |

However, the format or content of this table is not to be construed as limiting the invention.

Step 727: CNI Service Processing Outbound: CNI Service 121 transforms the received mobile terminated iSMS Message(s) 300 into a mobile terminated SMS Message(s) 200 that can be delivery to mobile clients. This typically involves converting the mobile terminated iSMS Message's 200 To and From Fields into "valid" SMS addresses. In this example, CNI Service 121 assigns the email address ADDR@MIKESSHOP.COM in step 730 the following short code with appended suffix: 10101:00003. This mapping between ADDR@MIKESSHOP.COM and 10101:00003 was previously defined in step 703. However, no transformation is needed for the To Field as it is already a valid mobile phone number. Once the transformation (if required) is complete, CNI Service 121 locates the user's mobile device within the cellular network and transmits the newly created mobile terminated SMS Message 200 to the mobile device in Step 729.

Step 730: User Receives Message and Replies: The user's SMS Client 111 now displays the received SMS Message. The From Field 220 for this message is populated with 10101: 00003 assigned by CNI Service 121 in step 727. Below is shown what the received message may look like for the current example. For the purposes of illustration, the token is shown embedded in < > below.

```
From: 10101:00003
Message:
Mike's Car Shop
Someone will call you within the
next 20 minutes. Please refer to the
conf. code QWOUY7654 to
receive your free tire rotation.
(H)elp
<00004>
```

Replies to this message are handled via the same method discussed above in connection with FIG. 7 starting at step 710 utilizing the response-callback bindings shown in Table 5 and the new token 00004 in replacement of the callback bindings shown in Table 4 and the token 00003 respectively.

The present invention has been described with reference to preferred embodiments. Obvious modifications and alterations will occur to others upon reading and understanding the preceding detailed description. For example, while FIG. 1 shows only a single cell phone/mobile device 110, a single CNI Service 121, a single Implementation Service 131 and a single Application Service 141, this is not to be construed as limiting the invention since, as one of ordinary skill in the art would recognize, the present invention is extensible to systems having multiple cell phones/mobile devices 110, multiple CNI Services 121, multiple Implementation Services 131 and multiple Application Services 141. Accordingly, the illustration in FIG. 1 is not to be construed in any manner as limiting the invention. Moreover, it is to be understood that CNI Service 121 encapsulates many different, potentially geographically distributed, components that enable SMS communications within cellular networks and enable communications between SMS clients 111 and Application Service 141. Specifically, CNI Service 121 includes a cellular network's SMSC service. CNI Service 121 also includes email gateways and IM gateways are used in a particular network configuration. CNI Service 121 also includes an SMS Aggregator if used in a particular network configuration. While the present invention has been explained in terms of these three embodiments of CNI Service 121, obvious modifications to these embodiments by those skilled in the art can produce alternative embodiments of CNI Service 121. Thus the presented embodiments are not to be construed as limiting the invention. It is intended that the invention be construed as including all such modifications and alterations insofar as they come into the scope of the appended claims or the equivalents thereof.

The invention claimed is:

1. A method of session based interactive short messaging via an intermediate device, the method comprising:
    (a) receiving a first message from a first device at the intermediate device;
    (b) responsive to the first message, the intermediate device initiating a first call to a second device, wherein the first call is based on the contents of the first message;
    (c) responsive to the first call, the intermediate device receiving from the second device a second message dispatched by the second device to the first device;
    (d) responsive to the second message dispatched in step (c), the intermediate device storing a first set of response-callback bindings, wherein each response-callback binding of the first set of response-callback bindings specifies an action to be taken in response to the intermediate device receiving a response to the second message that is related to said response-callback binding;
    (e) responsive to the second message and the first set of response-callback bindings stored in step (d), the intermediate device appending a first token to said second message;
    (f) responsive to the second message and appended first token in step (e), the intermediate device receiving from the first device said first token appended to a third message dispatched in response to the second message;
    (g) responsive to the third message, the intermediate device identifying and executing a first application callback based on the contents of the third message and the first set of response-callback bindings stored in step (d); and
    (h) responsive to the first application callback in step (g), the intermediate device receiving from the second device a fourth message dispatched by the second device to the first device.

2. The method of claim 1, further including:
    (i) responsive to the fourth message dispatched in step (h), the intermediate device storing a second set of response-callback bindings, wherein each response-callback binding of the second set of response-callback bindings specifies an action to be taken in response to the intermediate device receiving a response to the fourth message that is related to the second response-callback binding;

(j) responsive to the fourth message and the second set of response-callback bindings stored in step (i), the intermediate device appending a second token to said fourth message;

(k) responsive to the fourth message and appended second token in step (j), the intermediate device receiving from the first device said second token appended to a fifth message dispatched in response to the fourth message;

(l) responsive to the fifth message, the intermediate device identifying and executing a second application callback based on the contents of the fifth message and the second set of response-callback bindings stored in step (i); and (m) responsive to the second application callback, the intermediate device receiving from the second device a sixth message dispatched by the second device to the first device.

3. The method of claim 2, wherein:
the first device is a mobile device;
the second device is an application server;
the first, third and fifth messages are mobile initiated messages initiated by the mobile device; and
the second, fourth and sixth messages are application initiated messages initiated by an application service of the application server.

4. The method of claim 3, wherein the content of each mobile initiated message that the intermediate device utilizes to initiate a call to an application hosted by the application service includes at least one of the following:
an identification associated with the mobile device;
a delivery destination of the mobile initiated message;
at least a portion of a body of the mobile initiated message; and
the appended token associated with the mobile initiated message.

5. The method of claim 3, wherein the token included in an application initiated message is selected based on at least one of the following:
an identification associated with the mobile device;
a reply-to-address associated with the message; and
currently stored response-callback bindings.

6. The method of claim 2, wherein the first and second tokens are the same.

7. The method of claim 1, wherein:
the first call and the first application callback are made to a first application hosted by the second device; and
the first set of response-callback bindings relate to the first application.

8. The method of claim 1, further including:
(i) receiving a fifth message from a second application hosted by the second device at the intermediate device;
(j) responsive to the fifth message, the intermediate device storing a second set of response-callback bindings related to the second application, wherein each response-callback binding of the second set of response-callback bindings specifies an action to be taken in response to the intermediate device receiving a response to the fifth message that is related to said second response-callback binding;
(k) responsive to the fifth message, the intermediate device appending a second token to said fifth message;

(l) responsive to the fifth message and appended second token in step (k), the intermediate device receiving from the first device said second token appended to a sixth message dispatched in response to the fifth message;

(m) responsive to the sixth message, the intermediate device identifying and executing a second application callback to the second application based on the contents of the sixth message and the second set of response-callback bindings stored in step (j); and (n) responsive to the second application callback in step (m), the intermediate device receiving from the second device a seventh message dispatched by the second device to the first device.

9. A system of session based interactive short messaging, comprising:
means adapted to receive a first mobile initiated message from a mobile device;
means adapted to initiate a first call to an application hosted by an application service, wherein the first call is based on the contents of the first mobile initiated message;
means adapted to receive from the application service a first application initiated message dispatched by the application service to the mobile device;
means adapted to store a first set of response-callback bindings, wherein each response-callback binding of the first set of response-callback bindings specifies an action to be taken in response to the first application initiated message;
means adapted to select a first token based on at least one of the following: an identification associated with the mobile device, or a reply-to-address associated with the first application initiated message and currently stored response-callback bindings;
means adapted to append said first token to said first application initiated message;
means adapted to receive from the mobile device said first token appended to a second mobile initiated message dispatched in response to the first application initiated message;
means adapted to identify and execute a first callback to the application based on the first set of response-callback bindings and on the content of the second mobile initiated message, where said content includes at least one of the following: an identification of the mobile device, a delivery destination of the second mobile initiated message, a portion of the body of the second mobile initiated message, or the appended token; and
means adapted to receive from the application service a second application initiated message dispatched by the application service to the mobile device.

10. The system of claim 9, further including:
means adapted to store a second set of response-callback bindings, wherein each response-callback binding of the second set of response-callback bindings specifies an action to be taken in response to the second application initiated message;
means adapted to select a second token based on at least one of the following: an identification associated with the mobile device; a reply-to-address associated with the second application initiated message and currently stored response-callback bindings;
means adapted to append said second token to said second application initiated message;
means adapted to receive from the mobile device said second token appended to a third mobile initiated message dispatched in response to the second application initiated message;

means adapted to identify and a second callback to the application based on the second set of response-callback bindings and on the content of the third mobile initiated message, where the content includes at least one of the following: an identification of the mobile device, a delivery destination of the third mobile initiated message, a portion of the body of the third mobile initiated message, or the appended token; and means adapted to receive from the application service a third application initiated message dispatched by the application service to the mobile device.

11. The system of claim 9, wherein:

the first call and the first callback are made to a first application hosted by the application service;

the first application initiated message is initiated by the first application;

the first set of response-callback bindings relate to the first application; and the second application initiated message is initiated by a second application.

12. The system of claim 11, further including:

means adapted to store a second set of response-callback bindings related to the second application, wherein each response-callback binding of the second set of response-callback bindings specifies an action to be taken in response to the second application initiated message;

means adapted to select a second token based on at least one of the following: an identification associated with the mobile device; a reply-to-address associated with the second application initiated message and currently stored response-callback bindings;

means adapted to append said second token to said second application initiated message;

means adapted to receive from the mobile device said second token appended to a third mobile initiated message dispatched in response to the second application initiated message;

means adapted to identify and execute a callback to the second application based on the second set of response-callback bindings and on the content of the third mobile initiated message, wherein the content includes at least one of the following: an identification of the mobile device, a delivery destination of the third mobile initiated message, a portion of the body of the third mobile initiated message, or the appended token; and means adapted to receive from the application service a third application initiated message dispatched by the application service to the mobile device.

13. The system of claim 12, wherein the third application initiated message is initiated by the second application.

* * * * *

UNITED STATES PATENT AND TRADEMARK OFFICE
CERTIFICATE OF CORRECTION

PATENT NO.         : 8,457,665 B2
APPLICATION NO. : 12/808442
DATED              : June 4, 2013
INVENTOR(S)        : Chanakya C. Damarla Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 257 days.

Signed and Sealed this
Eighth Day of September, 2015

Michelle K. Lee
*Director of the United States Patent and Trademark Office*